United States Patent
Pandey et al.

(12) 
(10) Patent No.: US 6,475,675 B1
(45) Date of Patent: Nov. 5, 2002

(54) METHOD OF MAKING CLAD MATERIALS USING LEAD ALLOYS AND COMPOSITE STRIPS MADE BY SUCH METHOD

(75) Inventors: Awadh K. Pandey, Plainville; Bijendra Jha, North Attleboro, both of MA (US)

(73) Assignee: Engineered Materials Solutions, Inc., Attleboro, MA (US)

( * ) Notice: Subject to any disclaimer, the term of this patent is extended or adjusted under 35 U.S.C. 154(b) by 0 days.

(21) Appl. No.: 09/568,829

(22) Filed: May 11, 2000

Related U.S. Application Data

(62) Division of application No. 09/143,553, filed on Aug. 31, 1998, now Pat. No. 6,096,145
(60) Provisional application No. 60/069,968, filed on Dec. 18, 1997.

(51) Int. Cl.⁷ .................................................. H01M 4/64
(52) U.S. Cl. ........................ 429/233; 429/234; 429/245; 428/645
(58) Field of Search ................................ 429/233, 234, 429/245, 645

(56) References Cited

U.S. PATENT DOCUMENTS

| | | | |
|---|---|---|---|
| 3,882,648 A | | 5/1975 | Buchinski et al. |
| 4,467,954 A | | 8/1984 | Brenneman |
| 4,753,688 A | | 6/1988 | Myers |
| 4,771,179 A | * | 9/1988 | Ijiri et al. .................... 428/645 |
| 4,877,696 A | * | 10/1989 | Muto .......................... 428/645 |
| 4,939,051 A | | 7/1990 | Yasuda et al. |
| 5,339,873 A | | 8/1994 | Feldstein |

FOREIGN PATENT DOCUMENTS

| | | |
|---|---|---|
| EP | 0213203 A | 3/1987 |
| EP | 0252189 A | 1/1988 |
| GB | 745511 | 2/1956 |
| WO | WO 8603343 A | 6/1986 |
| WO | WO 9603780 A | 2/1996 |
| WO | 0795918 A | 9/1997 |

OTHER PUBLICATIONS

Published paper in Sheet Metal Industries in Jan. 1974 by G. Pickard and P.F. Rimmer.
Published paper in Journal of the Institute of Metals (1970, vol. 98) by J.E. Bowers and C.J. Goodwin.

* cited by examiner

*Primary Examiner*—Laura Weiner
(74) *Attorney, Agent, or Firm*—Pearne & Gordon LLP

(57) ABSTRACT

Lead alloy strip material (4, 6, 8) is roll bonded on one or both opposite face surfaces of a core strip material (2). The core material can be commercially pure titanium, austenitic stainless steel, low carbon steel, copper, aluminum, alloys thereof or other suitable metal that has sufficient ductility and that can provide desired attributes of stiffness and corrosion resistance to the composite. The lead alloy material is strengthened by the addition of less than approximately 1% of calcium or antimony and the core material is softened by fully annealing it prior to bonding. The several strips are reduced in thickness, preferably in approximately the same proportion, by at least 40% in the bonding pass to create a solid phase bond among the strips. The bonded composite is then rolled to final gauge and, for selected applications, is corrugated and cut to form panels (20, 22, 24) and etched to form pockets (8b) for pasting of active materials such as lead oxide for battery plates.

24 Claims, 10 Drawing Sheets

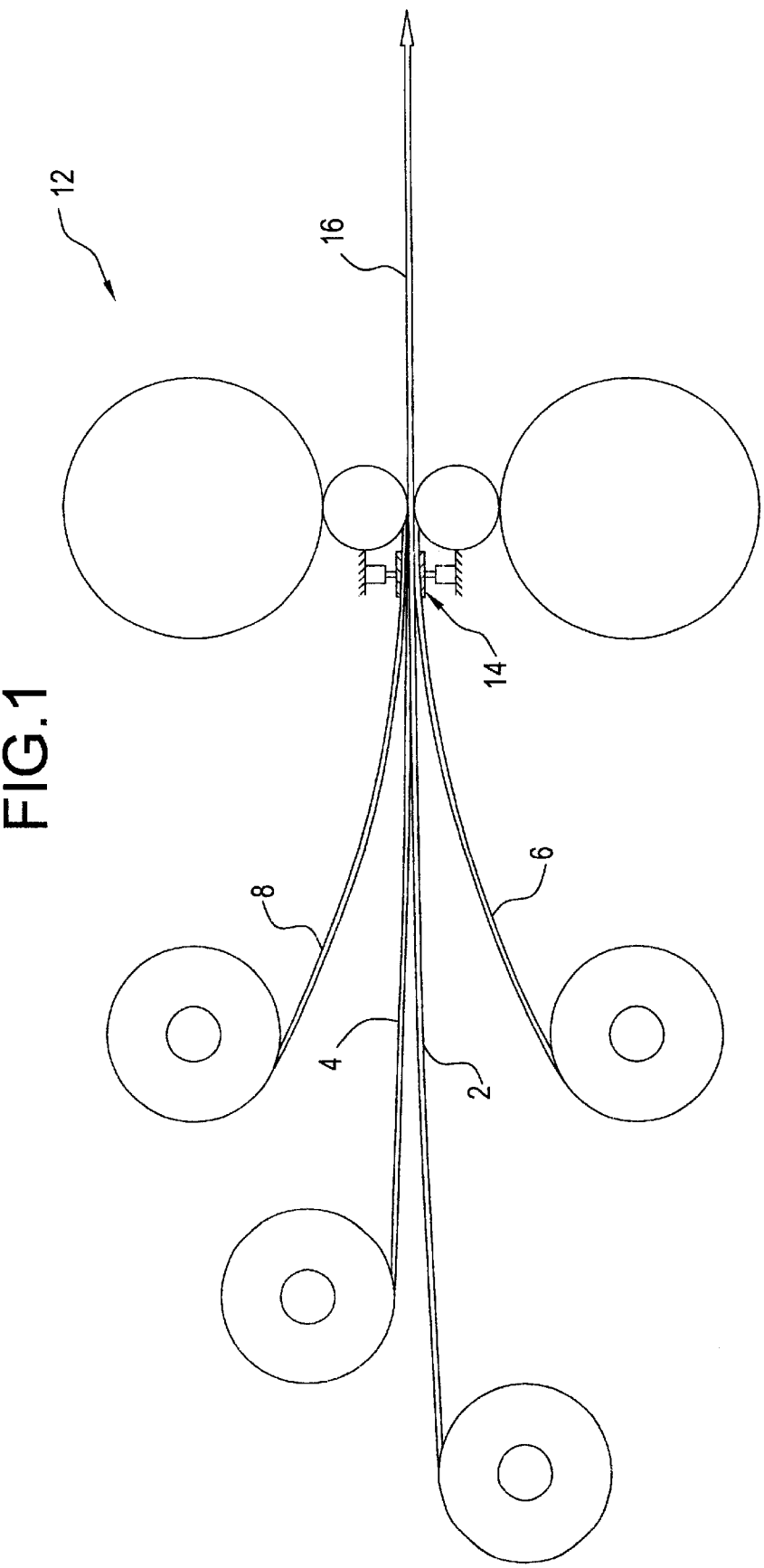

METHOD OF MAKING CLAD MATERIALS USING LEAD ALLOYS AND COMPOSITE STRIPS MADE BY SUCH METHOD

This application is a divisional of Application Ser. No. 09/143,553 filed Aug. 31, 1998 now U.S. Pat. No. 6,096,145 which claims priority under 35 USC Section 119 (e) (1) of provisional application No. 60/069,968 filed Dec. 18, 1997.

1. FIELD OF THE INVENTION

This invention relates generally to the solid phase bonding of metals, that is, the bonding of metals without the formation of any liquid phase material at the interface of the metals being bonded, and more particularly to methods for solid phase bonding one or more layers of a lead alloy and a core layer of other metal having a selected attribute of stiffness.

2. BACKGROUND OF THE INVENTION

Composites formed of a core of titanium, austenitic stainless steel, low carbon steel, copper, aluminum or other material having suitable ductility and which can provide desired attributes of stiffness and corrosion resistance to the composite, and outer layers of lead alloys are particularly useful for various applications including batteries, ducting, x-ray shielding, chemical plants and sound attenuation. One application of particular interest is that of battery plates for lead-acid batteries.

Electric and hybrid vehicles (i.e., vehicles having auxiliary power sources such as gasoline engines) are presently considered the most practical solution to meet increasingly tighter requirements for exhaust emission from off and on road vehicles. For these applications, at present, there are a number of power sources at various stages of development and use. These include lead/acid batteries, nickel-cadmium batteries, nickel-iron batteries, alkaline batteries and sodium-sulfur batteries. Of all the power sources being developed the lead/acid batteries are considered the most reliable and are the most widely accepted. Conventional lead/acid batteries are, at present, the most widely used electrical power source for the automotive industry (cars, vans, buses and trucks), for off-road vehicles such as fork trucks and for recreational vehicles such as golf carts. The advantages of lead/acid batteries include low cost, high voltage per cell and good capacity life. The disadvantages of such batteries are their bulky size and heavy weight. Batteries may constitute a significant portion, as much as 20 to 30%, of the total weight of the vehicles. This limits the range and the usefulness of vehicles, both electric and hybrid, using such batteries.

A bi-polar design for lead/acid batteries is considered a solution to overcome the size and weight limitations of conventional lead/acid batteries. In this design, the battery is made up of stacks of bi-polar plates. Each plate consists of positive and negative lead active surfaces on opposite sides of a separator core material. The core material provides separation between the two surfaces of opposite polarity, rigidity to the composite plate and/or serves as a corrosion barrier to the battery acid, such as sulfuric acid. The bi-polar design incorporates grids on the lead surfaces on which active materials, such as lead oxide, are pasted. Ions discharged at the anode travel through the material and collect at the cathode at the opposite surface. The bi-polar battery thus operates in a sealed gas mode where oxygen produced at the positive side of each plate diffuses to the negative side of the adjacent plate where it is reduced.

The biggest barriers to the commercialization of the bi-polar lead/acid batteries are the technical difficulties of manufacturing the composite plates and the difficulty of producing the grids.

SUMMARY OF THE INVENTION

It is an object of the present invention to provide a method for producing composite materials for bi-polar plates and for forming such plates having selected shapes or pockets for reception of pasted active materials. It is desirable to form a composite by roll bonding or cladding outer layers of lead or lead alloy to a core layer of suitable material; however, according to known techniques, a preliminary deposition of a layer of lead or lead alloy on the core is required by some other method such as coating by hot-dipping in a lead-rich alloy as noted by G. Pickard and P. F. Rimmer in a paper published in Sheet Metal Industries in January of 1974 wherein it is stated that a metal-to-metal bond cannot be formed by rolling lead and steel alone (page 18). This preliminary deposition not only is time consuming but it adds undesirable cost. It is an object of the present invention to provide a method which overcomes the limitations of the prior art noted above. Yet another object of the invention is a provision of a method for bonding one or more layers of lead alloy directly to a layer of commercially pure titanium, austenitic stainless steel, low carbon steel, copper, aluminum, alloys thereof or other metal having suitable ductility and which can provide desired attributes of stiffness and corrosion resistance to the resulting composite for any of various applications.

Briefly described, in accordance with the invention, a core layer of titanium, stainless steel, copper, low carbon steel, aluminum, alloys thereof or other suitable metal is prepared for roll bonding by chemical and mechanical cleaning. The outer layers of lead or lead alloys are prepared for roll bonding by vapor degreasing or chemical cleaning. The cleaned core material is sandwiched between two or more outer layers of cleaned lead or lead alloys. The sandwiched package is passed between a pair of bonding rolls in a conventional roll bonding mill. The sandwiched package is rolled in one pass with sufficient force to reduce the package thickness by over approximately 40%, preferably by about 55% and with the outer lead or lead alloys and the core material reduced in thickness simultaneously in about the same proportion. A solid state bond is thus created in the roll bonded material between the interfaces of the core material and the lead or lead alloys. The solid state bond in the composite material may be further strengthened with a room temperature aging cycle or an elevated temperature annealing cycle.

The roll bonded material is then edge trimmed, if needed, to remove edge cracks and then continuously rolled to the desired finish gauge. The finish rolled material is then edge trimmed, if needed, and then corrugated in a conventional corrugation mill. The corrugated material is sheared to size and then used to make bi-polar battery plates.

According to a feature of the invention the differences in physical properties between the core layer and the outer lead or lead alloy layers, particularly yield strength, is minimized by softening the core material, as by annealing, and by strengthening the lead or lead alloy layers by the addition of a minor amount of calcium or antimony, more specifically, less than 1% by weight. According to another feature of the invention, the amount of tension applied to the several layers going into the roll mill may be adjusted to control the specific thickness ratios of the several layers to one another.

According to yet another feature of the invention, conventional lubrication of the bonding rolls is eschewed with the bonding rolls being maintained in a dry condition.

BRIEF DESCRIPTION OF THE DRAWINGS

Other objects, advantages and details of the novel and improved method of this invention appear in the following detailed description of preferred embodiments of the invention, the detailed description referring to the drawings in which:

FIG. 1 is a diagrammatic front elevational view of several layers of material being fed through a bonding mill;

DESCRIPTION OF PREFERRED EMBODIMENTS

Figure 1A:
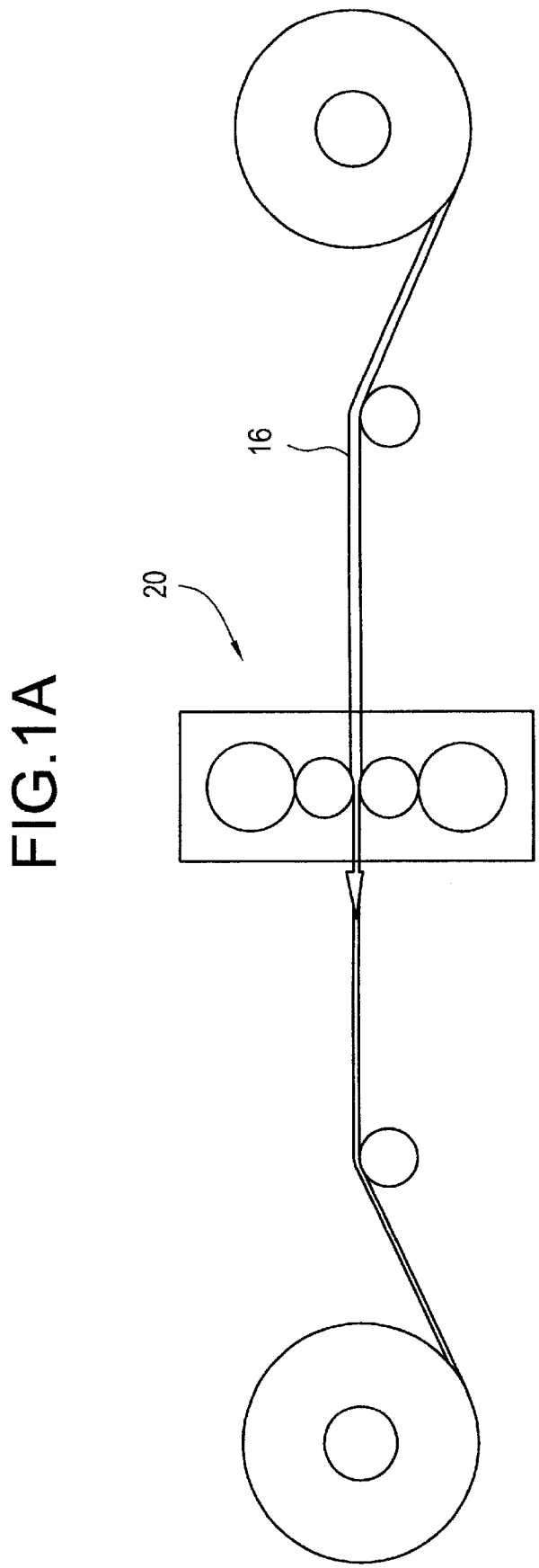
FIG. 1a is a diagrammatic front elevational view of bonded material being rolled to finish gauge, the view showing one pass through a rolling mill but actually representing multiple passes to obtain a desired finish gauge.

According to the invention and as stated supra, the core material can comprise titanium, aluminum, copper, stainless steel, low carbon steel, alloys thereof or other metals with sufficient ductility. The layers sandwiching the core comprise lead or lead alloys. According to the invention, each of the layers is deformed in a single pass through a conventional bonding mill, preferably in approximately the same percentage so that the ratio of cross sectional area of each of the layers going into the bonding mill is approximately the same as the cross sectional area of each of the layers of the composite. It has been found that to achieve a satisfactory bond the package thickness should be reduced by at least approximately 40% and preferably between approximately 50–60%. This deformation creates an interface between contiguous layers of virgin or nascent exposed metal which promotes the creation of at least a mechanical, solid phase bond between the respective layers. The amount of reduction achieved for each layer can be controlled by the tension placed on each layer. That is, when passing through the rolling mill the several layers are subjected not only to the pressure from the top and bottom rolls engaging the outer layers but they can also be subjected to front and back tension, both positive and negative, placed on each layer, for example, by means of brakes supplied to the supply rolls for positive tension, positive drives for negative tension and the like. Generally, by increasing positive front tension on a layer, i.e., increasing the force needed to ply out the layer from the supply, less reduction is obtained. In the present case, however, the lead layer needs to be strengthened in order to apply tension to it. This may be done by the addition of a minor amount of calcium or antimony, i.e., less than approximately 1% by weight, without having any noticeable negative impact on the electrical and corrosion characteristics of the lead layer. It has been found that as little as 0.06% by weight of calcium, for example, improves the yield strength sufficiently that tension can be applied to the lead layers. According to the invention, the difference between the mechanical properties of the core and lead layers is minimized by strengthening the lead layers and by fully annealing the core material. In this way, deformation of the core layer can be increased by softening the material and by decreasing tension on the core layer while deformation of the lead layer can be diminished by strengthening the lead layer and by applying tension to it to achieve equalized deformation of the several layers, i.e., within approximately +/−10%. Thus, by minimizing the differences between the mechanical properties of the several layers, as well as by controlling the tension on the layers, the input thickness of each layer of the sandwich can be selected in approximately the same cross sectional area ratio of the desired roll bonded composite.

Conventionally, in roll bonding of materials, lubrication is employed on the bonding rolls to create a film for separation between the outer surfaces of the metal layers and the bonding rolls. According to the invention, however, it is preferred to eschew such lubrication and to maintain the bonding rolls free of lubricants and in a dry condition.

The core material is prepared for roll bonding by chemical and mechanical cleaning. The outer layers of lead alloys are prepared for roll bonding by conventional vapor degreasing or chemical cleaning. As seen in FIG. 1, the cleaned core material 2 is sandwiched between: outer layers 4, 6, 8 of cleaned lead alloys. Three outer layers are shown but the particular number is a matter of choice with two, four or more layers being acceptable. Further, the invention also applies to bi-clad composite, i.e. , a lead alloy on only one face of the core or base metal.

Figure 2:
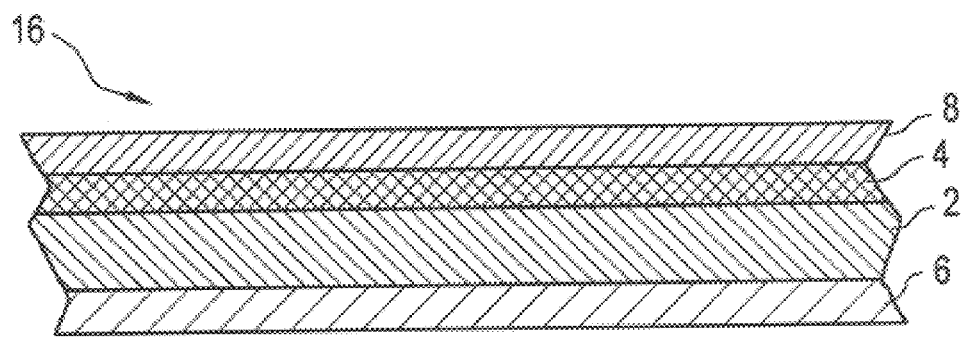
FIG. 2 is a schematic cross sectional representation of composite material made in accordance with the invention after roll bonding.

The sandwiched package formed by the several layers is preferably directed to bonding mill 12 through a conventional pressure board 14 disposed adjacent to the bonding mill for centering the layers and is rolled in one pass with sufficient force to reduce the package thickness at least approximately 40% and preferably by about 50–60%. By controlling the tension in the layers, the amount of reduction of the outer lead alloys 4, 6, 8 and the core material can be controlled. In general, it is usually preferred to obtain essentially the same percentage of reduction in thickness in each of the layers to form a composite having the same proportion of layers 2, 4, 6 and 8 before and after bonding. A typical composite 16, with a solid state bond created in the roll bonded material between the interfaces, is shown schematically in FIG. 2. The bond between the lead layers and the core created by such bonding is sufficient to pass conventional bonding tests. Further, it has been found that the strength of the bond between the lead alloy layers and the core layer can be increased by overnight, or longer, room temperature aging.

Figure 3:
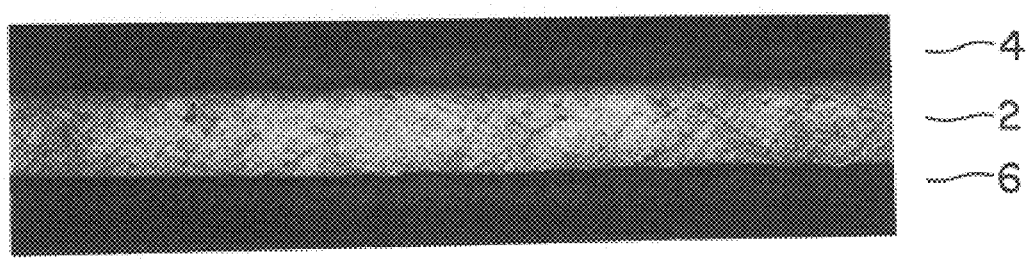
FIG. 3 is an enlarged micro-photograph of a cross section of a composite comprising layers of lead alloy, titanium, lead alloy after roll bonding and rolling to finish gauge, the outer dark layers (unnumbered) of FIG. 3, as well as the following micro-photographs showing thermoset mounting material used for taking the micro-photographs and do not form part of the composite per se.
Figure 4:
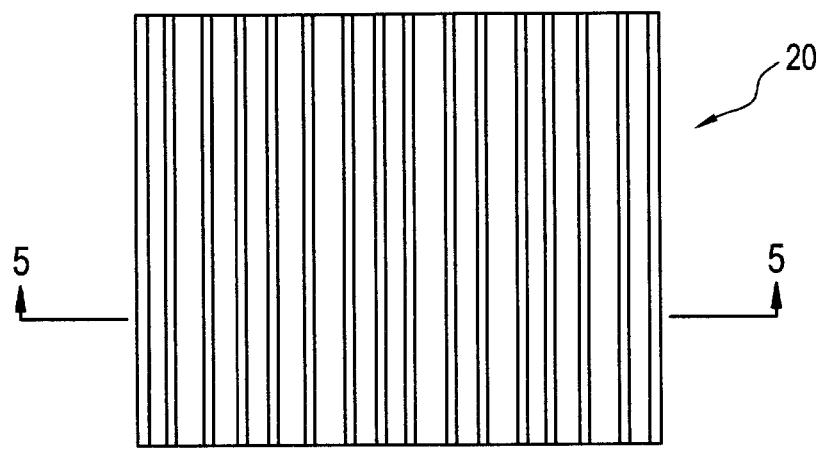
FIGS. 4, 6 and 8 are schematic top plan views of articles made from corrugated composite material made in accordance with methods of the invention.
Figure 5:
FIG. 5 is a cross section taken on line 5—5 of FIG. 4.

The roll bonded material is then edge trimmed, if desired, to remove edge cracks and then, as shown in FIG. 1a. continuously rolled to the desired finished gauge. As mentioned above, FIG. 1a shows a single pass through rolling mill 20; however, in practice, the composite is subjected to multiple passes to obtain the desired finish gauge. When rolling to finish gauge, care is taken to minimize the generation of heat so that the outer lead alloy layers do not soften excessively and start to stick to the rolls. Maintaining the rolling speed to less than approximately 20 fpm and the use of lubrication on the rolls are useful in this respect. An example of a two outer layer 4, 6 composite rolled to finish gauge is shown in FIG. 3. The finished rolled material is then edge trimmed, if desired, and then may be corrugated in a conventional corrugating mill and sheared to size to form a corrugated article such as plate 20 of FIGS. 4, 5; plate 22 of FIGS. 6, 7 and plate 24 of FIGS. 8, 9. The configurations of plates 20, 22, 24 are useful for making bi-polar lead-acid battery plates.

Figure 6:
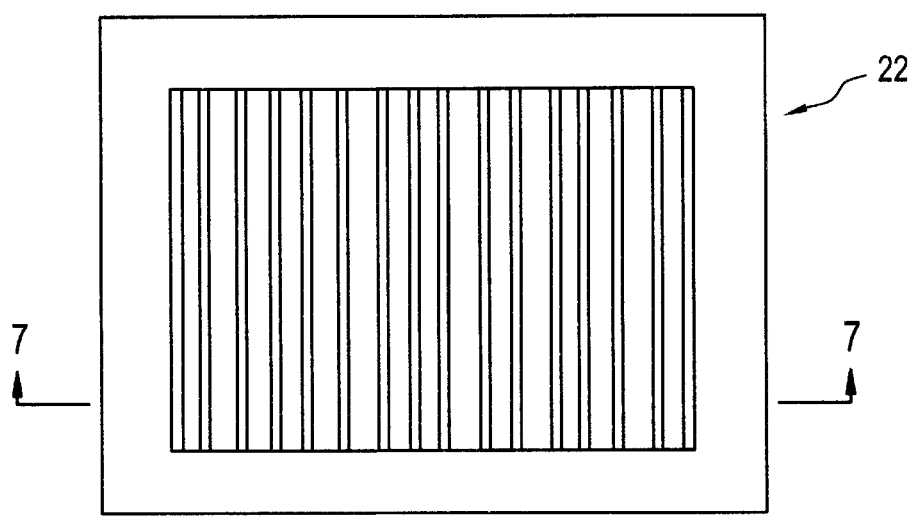
Figure 7:
FIG. 7 is a cross section taken on line 7—7 of FIG. 6.
Figure 8:
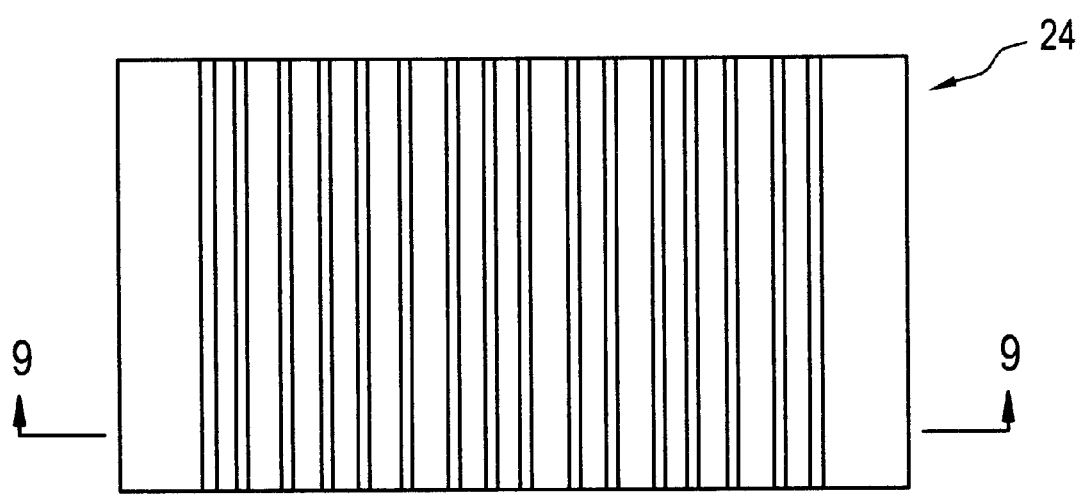
Figure 9:
FIG. 9 is a cross section taken on line 9—9 of FIG. 8.

In order to provide flanges for assembly and sealing of bi-polar battery plates, the corrugated die may be designed, if desired, in such a way as to leave a picture frame of uncorrugated area on either all four sides, as shown in FIG. 6, or just two edges of the corrugated area as shown in FIG. 8.

The following examples illustrate the invention.

EXAMPLE I

Figure 10:
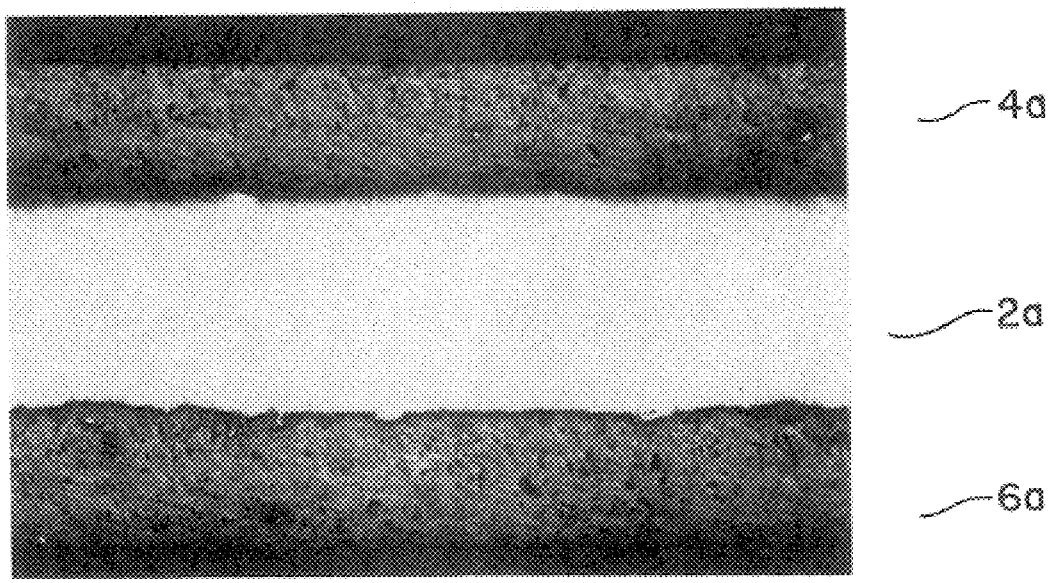
FIG. 10 is an enlarged micro-photograph, 100 amplification, of a cross section of a composite comprising layers of lead alloy, commercially pure titanium, lead alloy after bonding in accordance with Example I.
Figure 11:
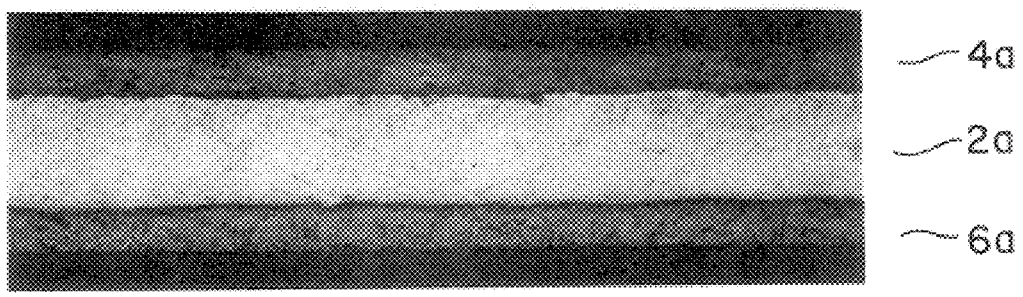
FIG. 11 is a view similar to FIG. 10, with the same amplification, of the composite material of FIG. 10 after rolling the bonded composite to finished gauge.

It A continuous strip 2a of fully annealed CP (commercially pure) titanium (Grade 50A) having a nominal thickness of 0.021 of an inch was thoroughly cleaned and scratch brushed. Two continuous strips 4a, 6a of fully age hardened lead alloy, each of nominal chemical composition of lead –0.06% calcium-1.5% tin, and each having a nominal thickness of 0.015 of an inch were cleaned by vapor degreasing. The cleaned and brushed CP titanium was sandwiched between top and bottom layers of lead alloy and then rolled on a conventional roll bonding mill having essentially dry bonding rolls in one pass with sufficient force to reduce the sandwich package thickness from about 0.051 of an inch to about 0.023 of an inch. i.e., a reduction of about 54% and using minimal tension on the separate layers. A sample of the; roll bonded composite material thus produced is shown in FIG. 10, a micro-photograph of a cross section of the roll bonded tri-clad composite comprising lead alloy 4a/CP titanium 2a/lead alloy 6a where a solid state bond between the interfaces of the titanium core material and the lead alloys is shown to have been established. The tri-clad material was then cold rolled on a convention rolling mill in multiple passes to the desired final gauge of 0.008 of an inch as shown in FIG. 11.

EXAMPLE II

Figure 12:
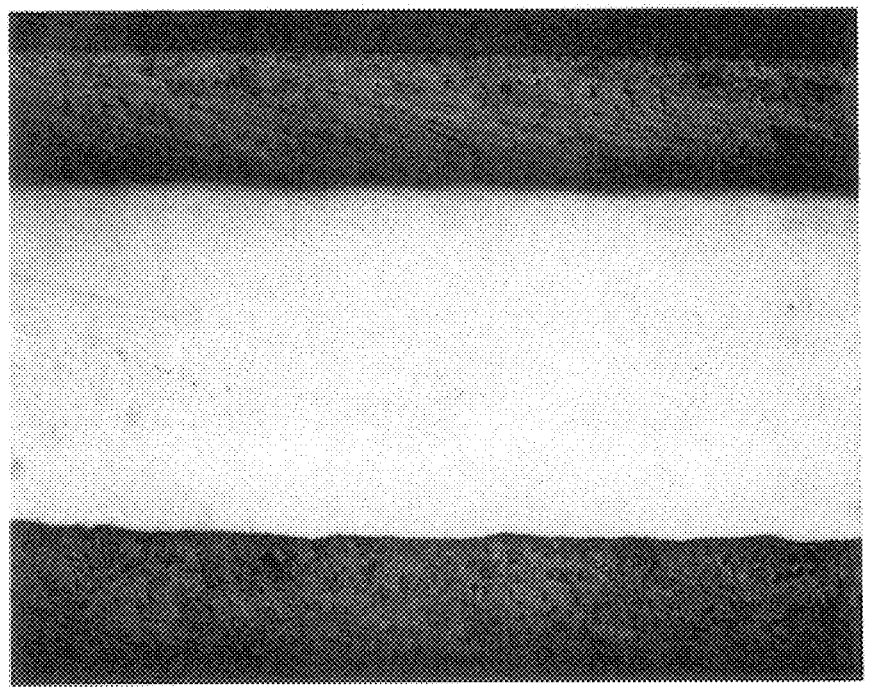
FIG. 12 is a view similar to FIG. 10, using the same amplification, of a composite comprising layers of lead alloy, 304 stainless steel, lead alloy, after roll bonding, made in accordance with Example II.

The same process as described in Example I except that the core layer 2b was fully annealed SAE 304 stainless steel having a thickness of 0.036 of an inch. In the roll bonding operation the initial'sandwich thickness of about 0.066 of an inch was reduced to a roll bonded thickness of about 0.030 of an inch, i.e., about 55% reduction. FIG. 12 shows a cross sectional micro-photograph of the tri-clad lead alloy 4a/304ss 2b/lead alloy 6a showing the establishment of a continuous solid state bond at the lead and the stainless steel interfaces.

EXAMPLE III

Figure 13:
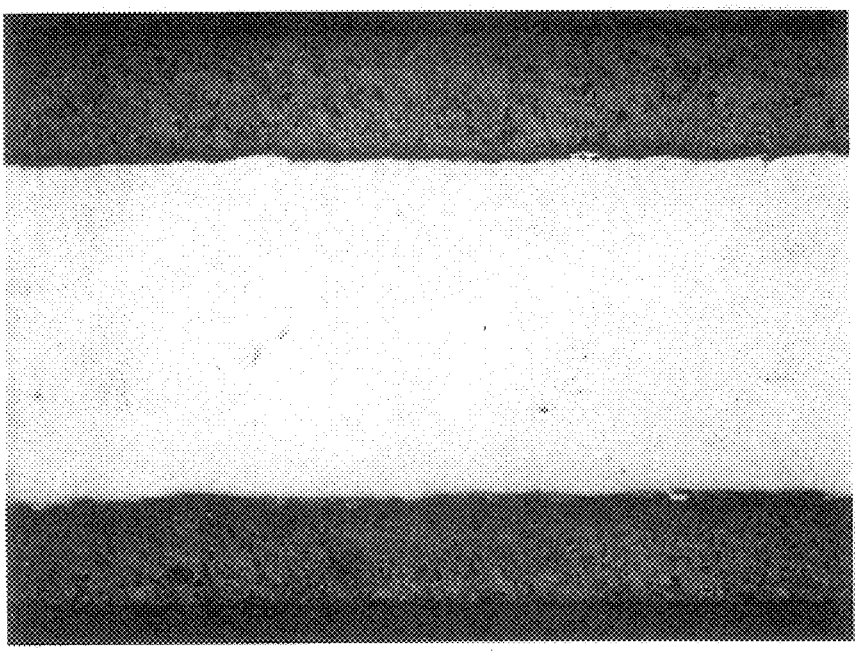
FIG. 13 is a view similar to FIG. 10, using the same amplification, of a composite comprising layers of lead alloy, 1008 low carbon steel, lead alloy, after roll bonding, made according with Example III.

This example was carried out in the same manner as in Example I except that the core layer used was fully annealed SAE 1008 low carbon steel (LCS) having a thickness of 0.038 of an inch. In the roll bonding operation the initial sandwich thickness of about 0.068 of an inch was reduced to a bonded thickness of about 0.028 of an inch, i.e., about 59% reduction. FIG. 13 shows a cross sectional micro-photograph of the tri-clad lead alloy 4a/1008LCS 2c/lead alloy 6a showing the establishment of a continuous solid state bond at the lead and the 1008LCS interfaces.

EXAMPLE IV

Figure 14:
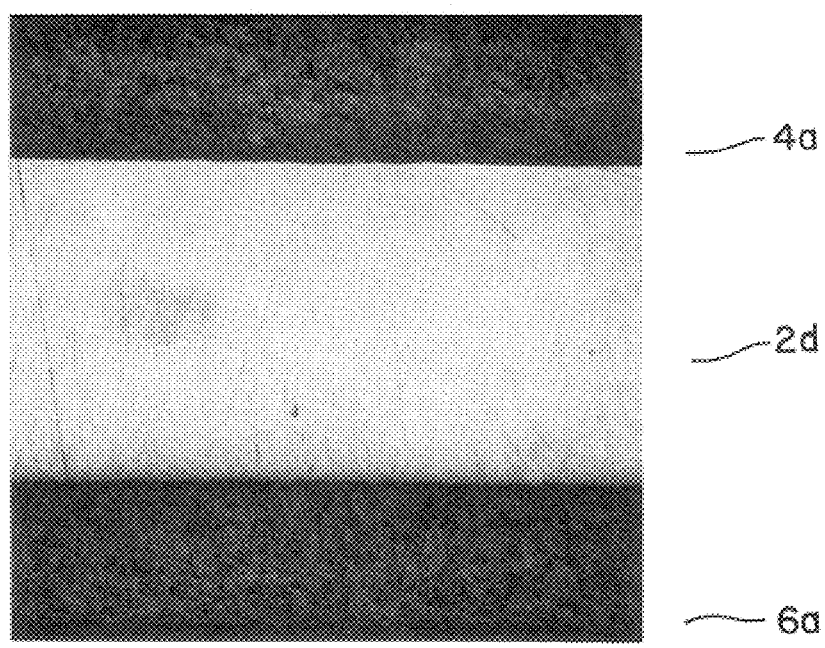
FIG. 14 is view similar to FIG. 10, using the same amplification. of a composite comprising layers of lead alloy, CDA101 copper, lead alloy, after roll bonding, made in accordance with Example IV.

This example was carried out in the same manner as in Example I except that the core layer used was fully annealed CDA101 copper having a thickness of 0.030 of an inch. In the roll bonding operation the initial sandwich thickness of about 0.060 of an inch was reduced to a bonded thickness of about 0.031 of an inch, i.e., about 48% reduction. FIG. 14 shows a cross sectional micro-photograph of the tri-clad lead alloy 4a/CDA101 copper 2d/lead alloy 6a showing the establishment of a continuous solid state bond at the lead and the CDA101 copper interfaces.

EXAMPLE V

Figure 15:
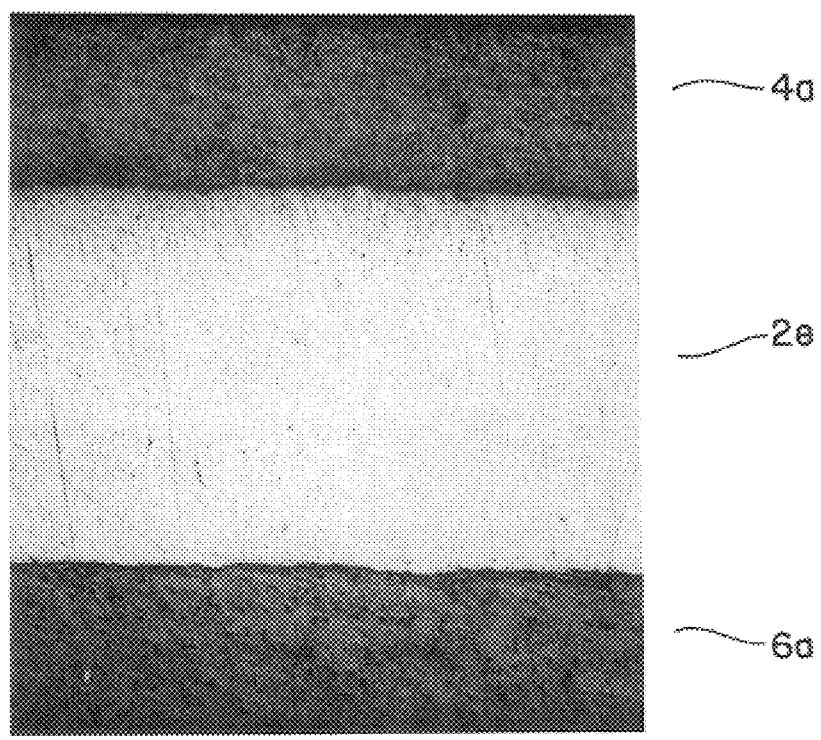
FIG. 15 is a view similar to FIG. 10, using the same amplification, of a composite comprising layers of lead alloy, 1100 aluminum, lead alloy, after roll bonding, made according with Example V.

This example was carried out in the same manner as in Example I except that the core layer used was fully annealed 1100 aluminum having a thickness of 0.041 of an inch. In the roll bonding operation the initial sandwich thickness of about 0.071 of an inch was reduced to a roll bonded thickness of about 0.036 of an inch, i.e., about 49% reduction. FIG. 15 shows a cross sectional micro-photograph of the tri-clad lead alloy 4a/1100 aluminum 2e/lead alloy 6a showing the establishment of a continuous solid state bond at the lead and the 1100 aluminum interfaces.

EXAMPLE VI

Figure 16:
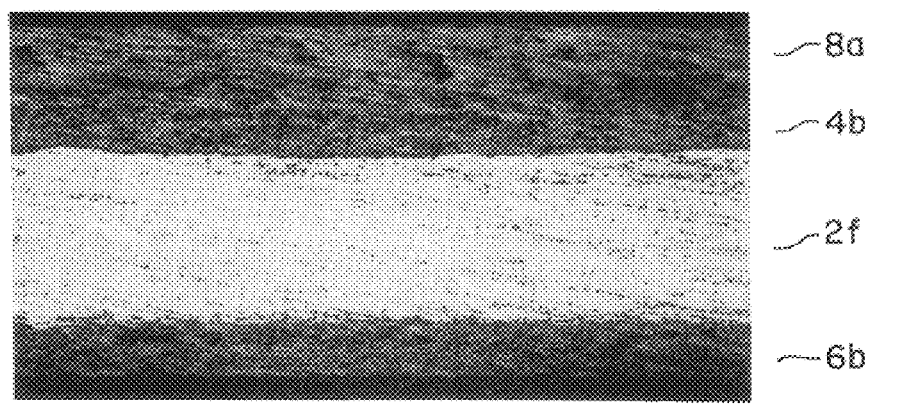
FIG. 16 is a view similar to FIG. 10, using the same amplification, of a composite comprising two separate layers of lead alloy and layers of 1100 aluminum and lead alloy, after roll bonding, made according to Example VI.

A continuous strip of fully annealed 1100 aluminum having a nominal thickness of 0.050 of an inch was thoroughly cleaned and scratch brushed. Three continuous strips of lead alloys were prepared for roll bonding by vapor degreasing; the first strip 8a had a nominal chemical composition of lead-0.06% calcium-01.5% tin and a nominal thickness of 0.020 of an inch; the second strip 6b had a nominal chemical composition of lead-0.05% calcium-1.5% tin and a nominal thickness of 0.015 of an inch; and the third strip 4b had a nominal chemical composition of lead-0.06% calcium-3.0% tin-0.04% silver and a nominal thickness of 0.015 of an inch. The three layers of lead alloys and the core layer of 1100 aluminum were sandwiched in the sequence of Pb.06Ca1.5Sn/Pb.06Ca3Sn.04Ag/1100Al/Pb.06Ca1.5Sn with respective thicknesses of 0.020/0.015/0.050/0.015 of an inch. The sandwiched package was then rolled in one pass on a conventional roll bonding mill having dry bonding rolls with sufficient force to reduce the package thickness from about 0.100 of an inch to a roll bonded thickness of about 0.045 of an inch and using minimal tension on the several layers. The amount of reduction thus achieved was about 55%. FIG. 16 shows a cross section of the quad-clad lead alloy 8a/lead alloy 4a/aluminum 2 f/lead alloy 6b and the establishment of a continuous solid state bond at the lead and the aluminum interfaces.

The roll bonded quad-clad material of Example VI was edge trimmed on a conventional slitter to remove edge cracks and then rolled in a conventional cluster Sendzimir type finish rolling mill, in multiple passes to thicknesses of 0.020 of an inch, 0.015 of an inch and 0.010 of an inch, respectively. No thermal treatment was applied either after roll bonding or in-between rolling passes. The cross section of the 0.020 of an inch rolled material, as shown in FIG. 17, shows uniform deformation in all the constituent layers of the composite.

Figure 18:
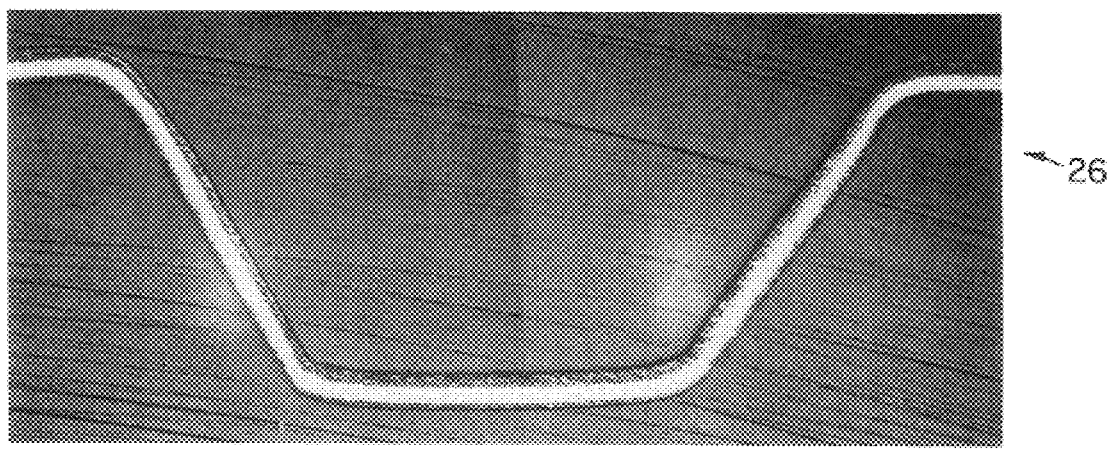
FIG. 18 is a cross sectional view, 10 amplification, of the two separate layers of lead alloy, 1100 aluminum, lead alloy composite of FIG. 17 after corrugating.

All the three gauges of the as rolled quad-clad material were corrugated in conventional corrugating equipment using a hex shaped, ¾ of an inch, corrugating die. A cross section of the 0.020 of an inch corrugated material 26 is shown in FIG. 18.

Figure 17:
FIG. 17 is a view similar to FIG. 11, using the same amplification, of the two separate layers of lead alloy, 1100 aluminum, lead alloy composite of FIG. 16, after rolling the bonded composite to finished gauge.
Figure 19:
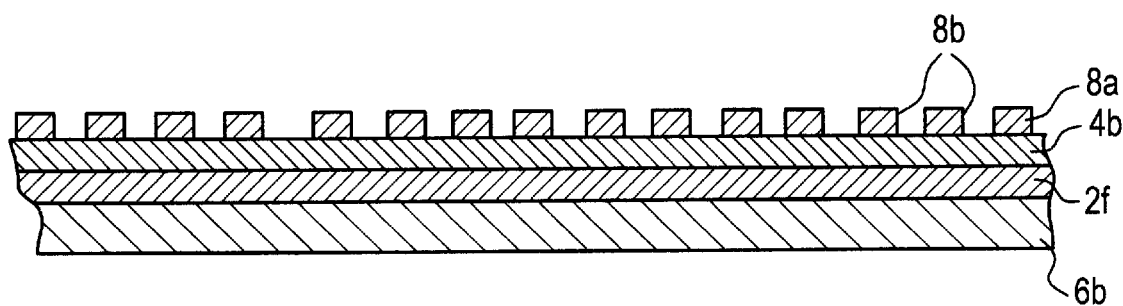
FIG. 19 is a schematic cross section of a composite formed with recesses in one outer layer thereof.

FIG. 19 is a cross section of a panel formed from the FIG. 17 material after layer 8a has been etched to form a grid of pockets, as indicated at 8b. In making battery plates suitable material, e.g., lead oxide paste, is applied to pockets 8b in a known manner.

EXAMPLE VII

This example was carried out in the same manner as Example I except that the core layer used was fully annealed CP (commercially pure) titanium (Grade 35 A) having a nominal thickness of 0.016 of an inch. In the bonding operation the initial sandwich thickness of 0.076 of an inch was reduced to a roll bonded thickness of about 0.032 of an inch. Table I shows parameters used for the roll bonding operation.

TABLE I

|  | Top | Core | Bottom |
| --- | --- | --- | --- |
| Components | Lead | Titanium | Lead |
| Input Thickness, Inch | 0.03 | 0.016 | 0.03 |
| Roll Bonded Thickness, Inch | 0.012 | 0.008 | 0.012 |
| Per cent Reduction | 60 | 50 | 60 |
| Back tension, PSIG* | 22 | 18 | 22 |

*Applied as a brake

Front tension=1250 pounds per square inch
Rolling force=28%
Roll bonding speed=25 feet per minute

EXAMPLE VIII

This example was carried out in the same manner as Example VI except that the core layer used was fully annealed IF (interstitial free) low carbon steel LCS AISI 1006 having a nominal thickness of 0.042 of an inch. In the roll bonding operation the initial sandwich thickness of 0.092 of an inch was reduced to a roll bonded thickness of about 0.039 of an inch. Table II shows processing parameters used for the roll bonding operation.

TABLE II

|  | Top | Upper Middle | Core | Bottom |
| --- | --- | --- | --- | --- |
| Components | Lead | Lead | 1006 | Lead |
| Input Thickness, Inch | 0.02 | 0.015 | 0.042 | 0.015 |
| Roll Bonded Thickness | 0.006 | 0.004 | 0.0215 | 0.0075 |
| Per cent reduction | 70 | 73 | 49 | 50 |
| Back tension, PSIG | ** | 18 | 38 | 14 |

*Applied as a brake
**Manually applied - specific amount not measured

Front tension=1100 pounds per square inch
Rolling force=35%
Roll bonding speed=30 feet per minute It will be noted that the back tension on the upper middle lead layer was higher than the back tension on bottom lead layer resulting in greater reduction of the upper middle layer.

EXAMPLE IX

This example was carried out in the same manner as Example VI except that the core layer used was fully annealed 3003 aluminum having a nominal thickness of 0.050 of an inch. In the roll bonding operation the initial sandwich thickness of 0.100 of an inch was reduced to a roll bonded thickness of about 0.049 of an inch. Table III shows processing parameters used for the roll bonding operation.

TABLE III

|  | Top | Upper Middle | Core | Bottom |
| --- | --- | --- | --- | --- |
| Components | Lead | Lead | 3003 | Lead |
| Input Thickness, Inch | 0.02 | 0.015 | 0.05 | 0.015 |
| Roll Bonded Thickness, Inch | 0.01 | 0.007 | 0.024 | 0.008 |
| Per cent reduction | 50 | 53 | 52 | 47 |
| Back tension, PSIG* | ** | 20 | 25 | 18 |

*Applied as a brake
**Manually applied - specific amount not measured

Front tension=1200 pounds per square inch
Rolling force=20%
Roll bonding speed=25 feet per minute As in Example VIII, the back tension on the upper middle lead layer was higher than that on the bottom lead layer resulting in greater reduction of the upper middle layer.

It should be understood that although the preferred embodiments of the invention have been described in order to illustrate the invention, the invention includes various modifications and equivalents to the disclosed embodiments. As stated supra, it is usually preferred to obtain essentially the same percentage of reduction in thickness in each of the layers: however, it is within the purview of the invention to vary the reduction of the several layers, as by varying the amount of back tension as in Examples VIII and IX. It is intended that the invention include all modifications and equivalents falling within the scope of the appended claims.

What is claimed:

1. A composite strip for use in a battery, said stoop having a first layer of a lead material containing a strengthening material in an amount of less than approximately 1% by weight and a base layer selected from the group consisting of titanium, aluminum, copper, austenitic stainless steel, 1008 low carbon steel and alloys thereof, wherein said base layer is essentially free from lead, said composite strip being made by the steps of:

chemically removing contaminants from the first layer, annealing the base layer to a fully annealed condition, mechanically brushing at least one face surface of the annealed base layer directing the layer and the base layer between bonding rolls of a bonding mill, and applying sufficient pressure to reduce the thickness of the layers by at least approximately 40% creating said composite strip.

2. A composite strip according to claim 1 in which a second layer of lead containing material is chemically cleaned of contaminants and is directed on the side of the base strip opposite that of the first layer between the bonding rolls along with the first and base layer.

3. A composite strip according to claim 2 in which the strengthening material is selected from the group consisting of calcium and antimony.

4. A composite strip according to claim 3 in which all the layers are all reduced in thickness by the bonding rolls in approximately the same proportion.

5. A composite strip according to claim 1, wherein said strengthening material in said first lead material layer and said annealing of said base layer minimize differences in physical properties between said first lead material layer and said base layer.

6. A composite strip according to claim 1, wherein said thickness of said base layer and said thickness of said first lead material layer are reduced in substantially equal proportion to one another, wherein the ratio of cross-sectional areas of said base layer and said first lead material layer remains approximately constant from an original thickness of said strip to said reduced thickness thereof.

7. A composite strip for use in battery plates in lead/acid batteries made by the steps of:

taking first and second strips of lead alloy each having an original thickness and containing a minor amount of strengthening material and removing lubricant contaminants from the strips, taking a strip of core material having an original thickness and being selected from the group consisting of titanium, aluminum, copper, stainless steel, low carbon steel, and alloys thereof, said strip of core material being essentially free from lead, fully annealing the strip of core material and mechanically roughening a surface of the annealed strip of core material, sandwiching the strip of core material with the first and second strips of lead alloy and directing the sandwiched strips between a pair of rolls of a bonding mill, and applying sufficient pressure on the rolls to reduce the thickness of the strips by at least 40% of the original thickness of the individual strips creating a bonded composite strip.

8. A composite strip according to claim 7 further comprising the step of gradually reducing the thickness of the bonded composite strip to a selected final gauge by repeatedly passing the bonded strip through a conventional rolling mill until a selected thickness of the bonded composite strip is obtained.

9. A composite strip according to claim 8 further including the step of aging bonded strip of reduced thickness at room temperature at least overnight.

10. A composite strip according to claim 8 further comprising the step of applying lubricating material on the rolls of the rolling mill and keeping the rolling speed to less than approximately 20 fpm to minimize heating.

11. A composite strip according to claim 8 further comprising the step of corrugating the reduced thickness bonded composite strip and cutting the corrugated strip to a selected shape.

12. A composite strip according to claim 8 in which a third strip of lead containing a minor amount of strengthening material is cleaned of lubricating contaminants and is directed through the pair of rolls on top of the first strip of lead alloy.

13. A composite strip according to claim 12 in which the third strip of lead contains silver and further comprising the strip of forming a plurality of pockets through the third strip after the bonded composite strip has been reduced to the final gauge.

14. A composite strip according to claim 7 in which the strengthening material is selected from the group consisting of calcium and antimony.

15. A composite strip according to claim 14 in which the first and second strips of lead contain less than approximately 1% by weight of strengthening material.

16. A composite strip according to claim 15 in which the first and second strips of lead contain approximately 0.06% by weight of calcium as strengthening material.

17. A composite strip according to claim 7 including the step of maintaining the pair of bonding rolls essentially free of lubricant.

18. A composite strip according to claim 7 in which tension is applied to the first and second strips tending to hold them back from the pair of rolls of the bonding mill.

19. A composite strip according to claim 18 in which minimal tension is applied to the strip of core material as it enters between the pair of rolls of the bonding mill.

20. A composite strip according to claim 7 further including the step of annealing the bonded strip at room temperature at least overnight.

21. A composite strip according to claim 7 further comprising the step of directing the first, second and core strips through a pressure board closely adjacent to the input side of the pair of rolls.

22. A composite strip according to claim 7 in which the first, second and core strips are reduced in thickness by the pair of rolls in approximately the same proportion.

23. A composite strip according to claim 22 further comprising the step of controlling the amount of reduction of the respective strips by controlling the amount of back tension on each of the strips as each respective strip enters the rolls of the bonding mill.

24. A composite strip according to claim 7 further comprising the step of controlling the amount of reduction of the respective strips by controlling the amount of back tension on each of the strips as each respective strip enters the rolls of the bonding mill.

* * * * *

UNITED STATES PATENT AND TRADEMARK OFFICE
CERTIFICATE OF CORRECTION

PATENT NO. : 6,475,675 B1
DATED : November 5, 2002
INVENTOR(S) : Awadh K. Pandey et al.

It is certified that error appears in the above-identified patent and that said Letters Patent is hereby corrected as shown below:

Title page,
Item [56], References Cited, FOREIGN PATENT DOCUMENTS, please delete the following reference:

"WO 0795918 A 9/1997", and insert therefor the following reference:
-- EP 0795918 A 9/1997 --.

Column 3,
Line 50, please delete "." (period), and insert therefor -- , -- (comma).

Column 5,
Line 55, please delete "It".

Column 6,
Line 2, please delete ";".

Column 7,
Line 14, please delete "roil", and insert therefor -- roll --.

Column 8,
Line 58, please delete ":", and insert therefor -- ; --.
Line 64, please delete "stoop", and insert therefor -- strip --.

Signed and Sealed this

Eighth Day of April, 2003

JAMES E. ROGAN
*Director of the United States Patent and Trademark Office*